Patented June 7, 1949

2,472,550

UNITED STATES PATENT OFFICE 2,472,550

MANUFACTURE OF ORGANIC NITRO COMPOUNDS

Arthur Ernest Wilder Smith, Charles William Scaife, and Harold Baldock, Norton-on-Tees, England, assignors to Imperial Chemical Industries Limited, a corporation of Great Britain No Drawing. Application May 18, 1945, Serial No. 594,602. In Great Britain April 3, 1944

3 Claims. (Cl. 260—644)

This invention relates to the production of organic nitro compounds.

According to the invention organic nitro compounds are produced by reacting nitrogen tetroxide in the presence or absence of oxygen with an aliphatic mono-olefine containing 3–6 carbon atoms or a mixture containing one or more such olefines in the presence of an organic oxygen-containing solvent, and treating the reaction products with water or a lower aliphatic mono-alcohol having less than 6 carbon atoms, said solvent being selected from the following: saturated aliphatic, saturated alicyclic or saturated aliphatic-alicyclic compounds containing carbon, hydrogen and oxygen only and having no oxygen-containing groups except ether or ester groups and no 3- or 4-membered rings, but excluding esters of formic acid; saturated heterocyclic or saturated aliphatic-heterocyclic compounds containing carbon, hydrogen and oxygen only and having only carbon and oxygen in the ring and no other groups except hydrogen, hydrocarbon, ether or ester groups, but excluding such compounds containing 3- or 4-membered rings. The organic oxygen-containing solvent will herein be referred to as "the oxygen-containing solvent as specified type." Preferably the reaction product is freed from the solvent and any remaining nitrogen oxides before being treated with water or alcohol. Preferably also the solvent is one which at atmospheric pressure boils below 180° C. and melts below 50° C.

Mixtures of solvents of the above types may also be employed. Furthermore, it is possible to employ these oxygen-containing solvents in admixture with other solvents, which are inert to the products and reactants, e. g. saturated hydrocarbons, but it is generally preferred to use them in undiluted form. In any case the solvent or mixture of solvents should be such as can at atmospheric pressure be boiled off completely below 180° C. A mixed solvent containing one or more oxygen-containing solvents of the selected type boiling above 180° C. may also be used, provided said mixed solvent can at atmospheric pressure be completely boiled off below 180° C. It is to be understood that the term solvent as herein used means a solvent for nitrogen tetroxide. Preferably, however, the solvent is also a solvent for the olefine reactant.

Examples of suitable solvents are: alkyl monoethers such as methylated ether, di-isopropyl ether, di-isoamyl ether, di-n-propyl ether, di-n-amyl ether; diethers, such as methylal; dioxan, tetrahydrofuran, tetrahydropyran, methyl, tetrahydrofuran, methyl tetrahydropyran; esters of saturated aliphatic mono-carboxylic acids such as ethyl acetate, propyl acetate, amyl acetate.

It is possible by carrying out the nitration in the presence of oxygen, or a mixture of oxygen with an inert gas or gases, to reduce the formation of undesirable and unstable compounds formed by side reactions, and thus increase the yield on distillation and also render the process of distillation safer. It is therefore, generally preferred, unless there are other more important considerations, to nitrate in the presence of oxygen or air. Generally from about 0.1 to about 0.3 mole of oxygen per mole of hydrocarbon reactant will be employed. A beneficial effect is obtained by introducing oxygen at any stage of the reaction, but it is desirable for the best results to introduce it from the commencement of the reaction, more especially when air or other mixture of oxygen with inert gas is employed.

Various temperatures and pressures may be employed, but conditions must be so chosen that the organic solvent is at least partly, and preferably mainly, in the liquid phase. Low temperatures are favoured, particularly those below the liquefaction point of nitrogen tetroxide. For simplicity it is preferred to operate at atmospheric pressure and around room temperature, or somewhat lower.

A mixture of mono-olefines or a mixture containing mono-olefines may be employed as starting material, but it is generally preferred to work with single pure hydrocarbons, because the separation of the various products is simplified thereby. When such mixtures are reacted it is generally necessary to carry out several fractional separations of the products. For some purposes, however, mixtures of isomeric or homologous nitro-compounds are quite suitable and such mixtures may, sometimes with advantage, be made directly from mixtures of suitable olefines according to the invention. Again, in order to avoid a troublesome preliminary separation, it may sometimes be desirable to use as starting material a mixture containing one or more olefines, and to isolate the desired nitro compound or compounds from the reaction product by the methods of separation described below or by more intensive fractionation. Preferably the starting material contains only diluents inert to $N_2O_4$.

With C3 and C4 olefines it is preferred to pass the olefine in gaseous form into a solution of nitrogen tetroxide in the selected type of solvent. The proportion of nitrogen tetroxide used will generally be in excess of that equivalent to the olefine, in order to prevent the formation of undesirable secondary products.

With C5 and C6 olefines it is preferred to dissolve the olefine in the selected type of solvent and to add the nitrogen tetroxide in liquid form or as a solution in the solvent. Here the proportion of nitrogen tetroxide used will generally be that equivalent to the olefine, for reasons of economy.

Low concentrations of $N_2O_4$ in the specified type of solvent may be employed, but it is generally preferred to use as high a ratio of $N_2O_4$ to solvent as possible but not so high that the effect of the solvent in the reaction is seriously diminished: otherwise there will be a reduction in the yields of the desired end products, and at the same time undesired compounds will be formed, and the isolation of the pure substances rendered more difficult. This applies particularly to C3 and C4 olefines. The nitrogen tetroxide employed should be as pure as possible: in particular it should contain little or no nitric oxide, nitric acid, or substances which would give rise to these compounds under the reaction conditions. When the reaction is carried out in the presence of oxygen, nitric oxide is, however, less detrimental.

The chief types of nitro compounds that may be produced according to the invention are dinitroparaffins, nitro-alkyl alcohols and nitro-alkyl nitrates. For satisfactory recovery of these nitro compounds, especially the nitro alcohols, it is essential to hydrolyse nitro-alkyl nitrites formed in the reaction to the nitro-alkyl alcohols, and this constitutes an important feature of the invention. Were this hydrolysis not effected the nitrites, which constitute a relatively large proportion of the products and are unstable and therefore difficult to handle, would decompose into undesirable products and thus reduce the yield of useful products and render the separation of the latter in substantially pure condition more difficult. According to this procedure, therefore, the nitro-alkyl nitrites are converted into the corresponding nitro-alkyl alcohols, by treatment with water or one of the lower aliphatic mono-alcohols, for example methanol, ethanol or propanol, but especially methanol. It is commonly beneficial to employ an excess of water or alcohol for the treatment of the reaction mixture. It is generally preferred to use water because when the nitro alcohols are water soluble they are extracted by the water from which they can be isolated by extraction with a solvent, for example, methylated ether, followed by distillation under reduced pressure. The dinitro paraffins, and the nitro-alkyl nitrates can then be recovered from the oil remaining after water washing, either by freezing out, when solids, from a suitable solvent, e. g. a lower aliphatic mono-alcohol such as methanol or ethanol, or by fractionally distilling under reduced pressure. The pure products may then be obtained by a second fractional distillation under reduced pressure. When the hydrolysis is effected with an alcohol e. g. methanol, the three nitro compounds are obtained as a solution in the alcohol and the dinitro compound, may then, if a solid, be isolated by freezing out.

The procedure described in the preceding paragraph is suitable for the recovery of the bulk of the products and is preferred for economic reasons, but it will be evident that if it were desired to produce certain of the products and not work up others, certain of the steps outlined above could be omitted. Furthermore, other forms of procedure coming within the scope of the invention can be employed, although less effectively. Thus, the dinitroparaffin may be separated, but in lesser yield, by freezing out from the main reaction product before treating with water and before or after removal of the solvent and nitrogen tetroxide. Again, by employing a solvent which boils below 100° C. at atmospheric pressure, the following procedure may be followed: after completion of the main reaction water is added, the whole is well mixed, the solvent is removed by distillation under reduced pressure, the aqueous layer containing the nitro-alkyl alcohols and nitrous and nitric acids is separated and the alcohols are isolated by solvent extraction and fractional distillation, while the dinitroparaffin and/or the nitro-alkyl nitrates are recovered from the residual oil by freezing out from a suitable solvent and/or fractional distillation under reduced pressure. A still further modification of the process is to employ a water immiscible solvent for the main reaction, to treat the reaction product with water, to separate the aqueous layer containing the nitro-alkyl alcohol from the mixture or solution of solvent, dinitroparaffin and nitro-alkyl nitrate, and then to recover the nitro alcohol from the aqueous solution by solvent extraction, followed by distillation under vacuum, and to recover the other two compounds from the non-aqueous portion by distilling off the solvent, and then freezing out from a suitable solvent or fractionally distilling under reduced pressure.

Examples of organic nitro compounds which may be prepared by the methods of the invention are: 1,2-dinitro-propane, 1-nitro 2-propanol and 1-nitro 2-propanol nitrate from propene; 2,3-dinitrobutane, 2-nitro 3-butanol and 2-nitro 3-butanol nitrate from butene-2; 1,2-dinitro butane, 1-nitro 2-butanol and 1-nitro 2-butanol nitrate from butene-1; and 1,2-dinitro-isobutane, nitro- tertiary butanol and nitro-tertiary butyl nitrate from isobutene. It is believed that of these the following are new compounds: 1,2-dinitropropane, an almost colourless liquid with a boiling point of 88° C. at less than 1 mm., characterised by the formation of 1,2-diaminopropane on reduction, and the preparation of the following derivatives, 1,2-diamino propane hydrochloride and 1,2-diamino propane dipicrate; 1-nitro 2-propanol nitrate, an almost colourless liquid with a boiling point of 71° C. at less than 1 mm., characterised by the formation of 1-amino 2-propanol on reduction; 1,2-dinitrobutane, an almost colourless liquid with a boiling point of 90° C. at less than 1 mm. characterised by the formation of 1,2-diaminobutane on reduction and the preparation of the following derivatives, 1,2-diaminobutane hydrochloride and 1,2-diaminobutane dipicrate; nitro-tertiary butyl nitrate with a boiling point of 92° C. at less than 1 mm. pressure.

If it is desired to produce a maximum of nitro-alkyl alcohols, no oxygen or a low oxygen/olefine ratio, for example not more than about 0.15 mole per mole of olefine, should be used. If it is desired to produce the nitro-alkyl nitrates in the highest possible yield the main reaction should be carried out with a high oxygen/olefine ratio, e. g. from 0.25 mole and upwards per mole of olefine, an excess of nitrogen tetroxide should be used, and no water should be present. A solvent free from water and alcohols should therefore be used. If in the nitration of isobutene it is desired to produce 1,2-dinitroisobutane as the chief product the reaction should be carried out in the absence of oxygen because thereby the amount of nitro-tertiary butyl nitrate, which is only separable with difficulty from the dinitro compound, is reduced. The dinitro compound can then be readily separated from the nitrate by freezing out from a suitable solvent, e. g. methanol.

From residues remaining after separation of the bulk of the dinitro compound it is possible to obtain further useful compounds by ordinary steam distillation or by distillation employing reduced pressure and/or superheated steam. Thus it is possible in this way to obtain α-nitroisobutene together with some nitromethane, nitro-tertiary butanol and acetone, from residues containing dinitro-isobutane.

The organic nitro compounds resulting from the practice of my invention are useful in explosive compositions and as starting materials for the synthesis of other organic compounds.

The invention is illustrated but not limited by the following examples:

Example 1

Into a solution of 378 grams of dry methylated ether and 163 grams of pure nitrogen tetroxide at 0° C. were passed 30 grams of propylene. The ether and excess nitrogen tetroxide were removed by distillation under reduced pressure, leaving 97 grams of oil. This was washed three times with twice its volume of water and the aqueous portions added together and extracted for 48 hours in a continuous ether extractor. The ether was removed by distillation and the remaining oil distilled under reduced pressure to yield 28.2 grams nitro propanol. The insoluble oil which remained after water washing, was distilled under reduced pressure and yielded 15.5 grams of 1,2-dinitropropane.

Example 2

85 grams of gaseous propylene and about 20% of its volume of oxygen were passed simultaneously into 435 grams of nitrogen tetroxide in 1000 grams of methylated ether maintained at 0° C. The product obtained, after removal of the solvent and excess nitrogen tetroxide, was washed four times with water, 300 ccs. being used each time. The aqueous extracts were mixed together and continuously extracted with ether for 48 hours. On distilling the ether extract 65.5 grams of 1-nitro 2-propanol was obtained.

The insoluble oil remaining after washing with water was dried by treatment with benzene and was then distilled to give 115 grams of a mixture of the nitrate ester of 1-nitro 2-propanol and 1,2-dinitropropane. The use of oxygen in the preparation gave products more stable to distillation.

Example 3

Into a solution of 42 grams pure nitrogen tetroxide dissolved in 100 grams of methylal at 0° C., were passed 10.5 grams of propylene over a period of 1 hour. The methylal and excess nitrogen tetroxide were removed by distillation under reduced pressure and the remaining oil was washed three times with 25 ccs. of water. The aqueous extracts were mixed together and after continuous ether extraction for 48 hours followed by distillation gave 4.1 grams of 1-nitro propanol-2. The remaining insoluble oil was dried by distilling off the water with benzene and then distilled under reduced pressure to give 5.0 grams of 1,2-dinitropropane.

Example 4

Into a solution of 718 grams of pure nitrogen tetroxide dissolved in 1674 grams of dry methylated ether at 0° C., were passed 303 grams of pure isobutene over a period of 4 hours. The ether and excess nitrogen tetroxide were removed by distillation under reduced pressure and the remaining oil washed four times with water, 800 ccs. being used in each of the first two washings, and 500 ccs. being used in each of the last two.

The emulsions which formed on the third and fourth washings were broken by means of small additions of the wetting agent sold under the registered trade-mark "Calsolene." The aqueous extracts were mixed together and after continuous ether extraction for 48 hours followed by distillation, a yield of 138 grams of nitro-tertiary butanol was obtained. 800 ccs. of methanol were added to the remaining insoluble oil and the solution was then cooled in a mixture of solid carbon dioxide and methanol with stirring. 238 grams of 1,2-dinitroisobutane crystallised out and were recovered by filtration.

After removal of the methanol from the mother liquor by distillation under reduced pressure, followed by distillation of the residue under reduced pressure, a further 89 grams of 1,2-dinitro-isobutane were obtained, together with 14 grams of nitro-tertiary butyl nitrate.

Example 5

Into a mixture of 2400 grams of technical dioxan and 780 grams of pure nitrogen tetroxide at 0–10° C., were passed 321 grams of pure isobutene over a period of 3 hours. The dioxan and nitrogen tetroxide were then removed under reduced pressure by distillation, and the remaining oil washed four times with water, 800 ccs. being used in each of the first two washings, and 500 ccs. being used in each of the last two.

The emulsions which formed on the third and fourth washings were broken by means of the wetting agent sold under the registered trade-mark "Calsolene." The aqueous extracts were mixed together, and after continuous ether extraction for 48 hours, followed by distillation, a yield of 83 grams of nitro-tertiary butanol was obtained. 800 ccs. of methanol were added to the remaining insoluble oil, and the solution was then cooled in a mixture of solid carbon dioxide and methanol with stirring.

290 grams of 1,2-dinitro-isobutane crystallised out and were recovered by filtration.

After removal of the methanol from the mother liquor by distillation, followed by distillation of the residue under reduced pressure, a further 75 grams of 1,2-dinitro-isobutane were obtained together with 14 grams of nitro-tertiary butyl nitrate.

Example 6

31.8 grams of isobutene were passed into a mixture of 234 grams of pure dry ethyl acetate and 102 grams of nitrogen tetroxide at 0° C. After removal of the ethyl acetate and excess nitrogen tetroxide under reduced pressure, the remaining oil was treated as described in Example 4, except that the first two washings were each done with 120 ccs. of water, and the last two washings were each done with 50 ccs. of water.

18.1 grams of 1,2-dinitro-isobutane and 5.4 grams of nitro-tertiary butanol were obtained.

Example 7

127 grams of gaseous isobutene together with 20% of its volume of oxygen were passed into a mixture of 300 gms. of nitrogen tetroxide and 694 grams of ether maintained at 0° C. The product obtained, after removal of the solvent and excess nitrogen tetroxide, was washed three times with water, using 400 ccs. each time. The aqueous extracts were combined and after continuous ether extraction for 48 hours, followed by distillation, yielded 72 grams of nitro-tertiary butanol. The original insoluble oil remaining after washing was dried by treatment with benzene and then distilled to give 145 grams of a mixture of nitro-tertiary butyl nitrate and 1,2-dinitro-isobutane. The use of oxygen in the preparation gave products more stable to distillation.

*Example 8*

Into a solution of 42 grams of pure nitrogen tetroxide dissolved in 100 grams of methylal at 0° C. was passed 14 grams of pure isobutene over a period of 1 hour. The methylal and excess nitrogen tetroxide were removed by distillation under reduced pressure, and the remaining oil washed twice with 30 ccs. and twice with 20 ccs. of water. The aqueous extracts were mixed together and after continuous ether extraction for 48 hours followed by distillation there was obtained 5 grams of nitro-tertiary butanol. 30 mls. of methanol was added to the remaining insoluble oil and the solution was then cooled in a mixture of solid carbon dioxide and methanol. After stirring for about 30 minutes, 6.5 grams of 1,2-dinitro-isobutane crystallised out and was recovered by filtration.

*Example 9*

51.9 grams of butene-2 were passed over a period of 1½ hours into a solution of 107 grams of nitrogen tetroxide in 365 grams of methylated ether at 5° C. The ether and excess nitrogen tetroxide were distilled off under reduced pressure and the residue comprising 139 grams of crude product was washed successively with 500 mls. and 100 mls. of water. The insoluble oil remaining was dried by distilling off the water with benzene under reduced pressure and was then fractionally distilled at 1 mm. pressure, to give 25.1 grams of 2,3-dinitrobutane. The aqueous washings were continuously extracted with ether for 48 hours, the extract was dried over sodium sulphate, the ether was distilled off under reduced pressure and the remaining oil was fractionally distilled at 1 mm. pressure to give 35.1 grams of 2-nitro 3-butanol.

*Example 10*

45.8 grams of butene-1 were passed over a period of 1 hour into a solution of 94 grams of nitrogen tetroxide in 314 grams of methylated ether at 5° C. The ether and excess nitrogen tetroxide were distilled off under reduced pressure, and the residue comprising 126 grams of crude product was washed successively with 400 mls., 120 mls., and 60 mls. of water. The insoluble oil was dried by distilling off the water with benzene under reduced pressure and then was fractionally distilled at 1 mm. pressure to give 38.7 grams of mainly 1,2-dinitrobutane. The aqueous washings were continuously extracted with ether for 48 hours, the extract dried over sodium sulphate, the ether distilled off under reduced pressure, and the remaining oil fractionally distilled at 1 mm. pressure to give 28.3 grams of 1-nitro 2-butanol.

We claim:

1. A process for the production of dinitro paraffins which comprises introducing at least one aliphatic mono-olefine having 3 to 6 carbon atoms into a solution of nitrogen tetroxide in an organic, saturated, non-benzenoid solvent compound containing carbon, hydrogen and oxygen only, all oxygen in said solvent being present in an ether group, and all ring systems present in said solvent compound having at least 5 members, said nitrogen tetroxide being in molar excess of said mono-olefine and being free from nitric acid and from nitric oxide; removing the solvent and any remaining nitrogen oxides by distillation at reduced pressure; treating the reaction product with water; removing the aqueous layer; and recovering dinitro paraffin from the non-aqueous residue by fractional distillation.

2. A process for the production of 1,2-dinitropropane which comprises introducing gaseous propene into a solution of nitrogen tetroxide in an organic, saturated, non-benzenoid solvent compound containing carbon, hydrogen and oxygen only, all oxygen in said solvent being present in an ether group, and all ring systems present in said solvent compound having at least 5 members, said nitrogen tetroxide being in molar excess of said propene and being free from nitric acid and from nitric oxide; removing the solvent and any remaining nitrogen oxides by distillation at reduced pressure; treating the reaction product with water; removing the aqueous layer; and recovering 1,2-dinitropropane from the non-aqueous residue by fractional distillation.

3. A process for the production of 1,2-dinitroisobutane which comprises introducing gaseous isobutene in the absence of oxygen into a solution of nitrogen tetroxide in an organic, saturated, non-benzenoid solvent compound containing carbon, hydrogen and oxygen only, all oxygen in said solvent being present in an ether group, and all ring systems present in said solvent compound having at least 5 members, said nitrogen tetroxide being in molar excess of said isobutene and being free from nitric acid and from nitric oxide; removing the solvent and any remaining nitrogen oxides by distillation at reduced pressure; treating the reaction product with water; removing the aqueous layer; treating the non-aqueous layer with methanol; reducing the temperature to freeze out at least a portion of the 1,2-dinitroisobutane; and recovering the balance of the 1,2-dinitroisobutane by fractional distillation of the residual solution.

ARTHUR ERNEST WILDER SMITH.
CHARLES WILLIAM SCAIFE.
HAROLD BALDOCK.

REFERENCES CITED

The following references are of record in the file of this patent:

UNITED STATES PATENTS

| Number | Name | Date |
|---|---|---|
| 2,181,531 | Hass et al. | Nov. 28, 1939 |
| 2,330,112 | Cox | Sept. 21, 1943 |
| 2,382,241 | Levy | Aug. 14, 1945 |
| 2,402,315 | Crowder | June 18, 1946 |

OTHER REFERENCES

Urbanki et al., "Comptes Rendus Acad. Sci.," vol. 203 (1936), pages 620–622.

Schmidt, "Ber. deutsche Chem. Gesell.," vol. 35 (1902), pp. 2327 and 2338.

Michael et al., "Jour. Org. Chem.," vol. 5 (1940), pp. 12 and 13.

(Other references on following page)

Michael et al., "JACS," vol. 59, May 1937, pp. 844 and 847.
Maas, Chem. Cent., 1899 I, p. 179.
Monti, "Gazzeta Chimica Ital.," vol. 60 (1930), p. 789 and p. 791.
Pauwels, Chem. Cent., 1898 I, p. 143.
Urbanski et al., "Comptes Rendu Acad. Sci.," vol. 203 (1936), p. 621.
Shaw, "Chem. Zent.," 1898 I, p. 439.
Poni et al., "Chem. Zent.," 1903 I, p. 624.
Demajamov et al., "Chem. Zent.," vol. 80, 1909 II, p. 1841.
Ssidorenko, "Chem. Zent.," 1907 I, p. 399.
Ipatiev, "Chem. Zent.," 1923 III, p. 660.
Jour. Org. Chem., vol. 4 (1939), pp. 195–197.
Jour. Org. Chem., vol. 5 (1940), pp. 100–105.
Demajanov, "Chem. Abstracts," vol. 25 (1931), p. 1215.